(12) United States Patent
Merz et al.

(10) Patent No.: US 6,343,441 B1
(45) Date of Patent: Feb. 5, 2002

(54) UNFOLDABLE ROOF CONSTRUCTION

(75) Inventors: Hans-Günter Merz; Sabine Sauter, both of Stuttgart (DE)

(73) Assignee: Merz Saulter Zimmermann GmbH, Stuttgart (DE)

( * ) Notice: Subject to any disclaimer, the term of this patent is extended or adjusted under 35 U.S.C. 154(b) by 0 days.

(21) Appl. No.: 09/601,303

(22) PCT Filed: Dec. 19, 1998

(86) PCT No.: PCT/DE98/03736

§ 371 Date: Jul. 31, 2000

§ 102(e) Date: Jul. 31, 2000

(87) PCT Pub. No.: WO99/39937

PCT Pub. Date: Aug. 12, 1999

(30) Foreign Application Priority Data

Feb. 5, 1998 (DE) .......................................... 198 04 435

(51) Int. Cl.⁷ .............................. E04B 7/16; E04B 3/38; E04B 15/36
(52) U.S. Cl. .................... 52/66; 52/63; 52/71; 52/79.5; 52/86; 52/222; 52/641; 135/88.01; 135/88.13; 135/128; 135/130; 135/146
(58) Field of Search ................................ 52/86, 63, 66, 52/71, 79.5, 143, 222, 641; 135/188.01, 188.13, 124, 128, 130, 143, 144, 146; 296/168, 173, 109, 112, 107.12

(56) References Cited

U.S. PATENT DOCUMENTS

| 1,840,745 A | | 1/1932 | Shoaf |
| 2,704,522 A | * | 3/1955 | Frieder et al. |

(List continued on next page.)

FOREIGN PATENT DOCUMENTS

| AT | 132285 | * | 3/1933 | ................... 52/86 |
| DE | 2112926 | | 3/1971 | |
| DE | 3115139 | | 4/1981 | |
| DE | 3822446 | | 7/1988 | |
| FR | 2145551 | | 7/1972 | |
| FR | 2535658 | | 11/1982 | |
| FR | 2677066 | | 5/1991 | |
| GB | 690658 | * | 4/1953 | ................. 52/641 |
| GB | 2085941 | | 10/1980 | |
| GB | 2094367 | * | 9/1982 | ................. 135/143 |
| WO | WO8204383 | | 6/1981 | |

OTHER PUBLICATIONS

"Detail", vol. 1, pp. 26–28.

*Primary Examiner*—Robert Canfield
(74) *Attorney, Agent, or Firm*—Walter A. Hackler

(57) ABSTRACT

In a roof construction (10) with several erected support arches carrying a tentered roof skin (15), both ends of which support arches are held with a fixed distance to one another in the carrying state, each support arch (11) is constituted by several sections (12; 12a, 12b) each connected to one another via joints (13), where a lock is assigned to each joint (13), which limits the unfolding of neighboring sections (12a, 12b) to about their straightened position. In the carrying state of the support arch (11) all its joints (13) are bridged underneath by tensioned pulling connections (16), which engage on both sides of the bridged joint (13) on a section (12a, 12b). Furthermore, in the region of each joint (13) a spacer (19) is provided acting between the support arch (11) and the corresponding pulling connection (16), which spacer (19) directs the pulling connection inwards past the connecting line defined by the two points (18a, 18b) of engagement. Hence, with simultaneously fast and simple dismounting and mounting also roof constructions with relatively long support arches can be carried safely.

19 Claims, 2 Drawing Sheets

U.S. PATENT DOCUMENTS

| | | | |
|---|---|---|---|
| 3,708,944 A | * | 1/1973 | Miyake .................... 52/86 X |
| 3,798,851 A | * | 3/1974 | Utahara ........................ 52/86 |
| 3,973,370 A | * | 8/1976 | McAllister ................ 52/66 X |
| 4,223,506 A | * | 9/1980 | Blair et al. .................. 52/644 |
| 4,244,384 A | | 1/1981 | Bean |
| 4,325,207 A | * | 4/1982 | Russell et al. ............... 52/641 |
| 4,353,190 A | | 10/1982 | Gleeson |
| 4,373,305 A | * | 2/1983 | Russell .......................... 52/86 |
| 4,619,099 A | * | 10/1986 | Sircovich .................. 52/86 X |
| 4,953,329 A | * | 9/1990 | Frantl ............................ 52/81 |
| 5,159,790 A | * | 11/1992 | Harding ........................ 52/86 |
| 5,335,684 A | | 8/1994 | Hanninen |
| 5,478,129 A | | 12/1995 | Goto |

* cited by examiner

UNFOLDABLE ROOF CONSTRUCTION

The present invention concerns a roof construction, in particular a self-supporting roof construction, with several erected support arches carrying a tentered roof skin, both ends of said support arches being held with a fixed distance to one another in the carrying state.

Such roof constructions are, for example, known for tents, where the tent roof is supported and held in shape via tubular support arches. Such support arches are usually put together from several sections and erected on the spot, and can carry, with suitable anchoring, for example at the ground of the tent, the tent roof in a supporting fashion due to their flexural strength.

For larger tent roofs such a construction, as it is known for relatively small tent roofs, is not possible anymore since the flexural strength of the support arches is not sufficient anymore to be able to take up the weight of the tent roof resting on them. Furthermore, for larger roof constructions, the relatively long support arches would have to be disassembled for transport and then put together again on the spot, which would involve expensive assembly and disassembly efforts as well as a large expenditure of time.

Hence it is the object of the present invention to further develop a roof construction of the aforementioned type such that with simultaneously fast and simple dismounting and mounting also roof constructions with relatively long support arches can be carried safely.

This object is solved according to the invention in that each support arch is constituted by several sections each connected to one another via joints, where a lock is assigned to each joint, which limits the unfolding of neighboring sections to about their straightened position, and that in the carrying state of the support arch all its joints are bridged underneath by tensioned pulling connections, which engage on both sides of the bridged joint on a section and that in the region of each joint a spacer is provided acting between the support arch and the corresponding pulling connection, which spacer directs the pulling connection inwards past the connecting line defined by the two points of engagement.

This roof construction has the essential advantage that the support arches can be easily folded together via their joints and can thus be erected on the spot into their preferably arc-shaped final position by unfolding. In order for an erected support arch not to disintegrate due to its own weight and the weight of the roof skin bearing on it, each pulling connection tensioned beneath a joint is spaced thus far towards the inside by the associated spacer that the tensile force acting between two points of engagement on the support arch comprises on the spacer also a component directed outwards towards the joint, which component can take up the forces acting on the joint towards the inside. Furthermore, the inventive roof construction can be quickly and easily assembled and disassembled due to the unfolding and folding of the support arches.

In preferred embodiments of the invention, the erected support arches are disposed in longitudinal direction behind one another or in pairs in order to stiffen the roof construction in longitudinal direction, where neighboring erected support arches support each other in pairs.

Neighboring erected support arches can cross each other either in pairs in the crown area by supporting each other, or they touch each other in pairs in the crown area, which is a preferred development. In the latter case, the roof construction or the roof skin is stiffened in longitudinal direction via the crowns of the support arches touching in pairs.

In a further preferred embodiment, the two ends of a support arch are fixed, in particular hinged, to parts which can be moved outwards, preferably can be hinged down. By tilting the parts, which determine the distance between the two ends of the support arch, this distance enlarges, thus the sections of the support arch can be at least partially unfolded in direction to its straightened or arc-shaped final position if the sections are, for example, folded like a bellow. Preferably the parts which can be tilted outwards are side walls or ceiling parts of a vehicle body.

As an advantageous development of this embodiment it is provided that parts that are moved outwards, preferably hinged down, and are fastened in this state form a base of the roof construction. This has the advantage that not only the sections of a support arch, but at least also a part of the base is designed foldable. Hence, the space required by the roof construction together with its base in the folded state can be kept particularly small.

In particularly preferred embodiments, sections of a support arch, preferably all of its sections, can be folded between parts put upright. By moving or hinging down and outwards of the parts, these sections of a support arch, in particular folded together like a bellow, can then be pulled apart and unfolded outwards towards the erected support arch. Then the support arch can be transferred into its completely erected final position manually by a person, by whom the formation of the individual pulling connections can also be initiated.

In particularly preferred embodiments of the inventive roof construction the pulling means provided on a support arch are formed by a single common pulling rope. If the support arch was partially or already completely unfolded in its unfolded final position, this pulling rope tensioning all the sections of a support arch underneath is tightened, thus the individual sections are tensioned in their final positions in which they can support their own weight and that of the roof skin. The pulling rope is deviated in the area of the joints towards the inside by the spacers. The pulling rope is preferably held in corresponding guides on the sections and on the spacers, and that also in the folded state of the support arch. For example, by means of a hydraulic pulling device, which engages on one end of the pulling rope, this can be tightened and tensioned.

The sections are fiber-enforced, in particular by glass material, or completely made from glass fiber material, in order to increase the tensile and flexural strength as well as the stability of shape and stability of the sections or of the erected support arch. The use of fiber material for the sections has the additional advantage, in contrast to rigid sections, that the support arch can be better adjusted to the contour of the tentered roof skin.

The roof skin is preferably connected to the support arches permanently and can be folded, for example like a bellow, as well as unfolded with the support arches. The roof skin is preferably designed as light permeable membrane, in order to illuminate the inner space covered by the membrane with daylight.

In particularly preferred embodiments of the invention, the base of the roof construction is formed by a loading area and by parts of a vehicle which can be hinged outwards onto the level of the loading area, in particular by side walls of a lorry. The roof construction can then be used flexibly and variably as a mobile unit, for example, as surface mounting on a lorry. This driveable unit can be quickly transferred, for example, into a sheltered, temporary exhibition area by a transformation on the vehicle.

As advantageous further development of this embodiment a substructure can be provided which supports the base of the roof construction about on the level of the loading area of the vehicle. This substructure can, for example, be formed by base supports, which support the hinged down side walls of the vehicle. If additionally also the loading area is supported by a suitable substructure, the vehicle can be detached from the loading area and the side walls and removed underneath those, if the base of the roof construction is formed and supported.

If the roof construction tensioned underneath should not be visible from the inside by an observer, a textile inner covering can be held in a hanging fashion on the support arches, and that in particular on the spacers, with the roof construction being erected.

The present invention also concerns a vehicle with a loading area and with a roof construction, as described earlier, roofing over this loading area in the unfolded state. For example, as surface mounting on a vehicle the roof construction can be used as mobile unit flexibly and variably, in particular for a traveling exhibition. By the transformation on the vehicle this driveable unit can be quickly transferred, for example, into a covered, temporary exhibition area and thus be integrated variably in a town landscape.

Such a vehicle can be quickly transformed into a roofed over space, since the roof construction can be folded between two upright side walls, in particular side walls which can be put upright, of the vehicle. The unfolding of the roof construction can be initiated, as described earlier, by hinging down the side walls.

In a further advantageous embodiment of the inventive vehicle the two outer sections of a support arch are hinged to ceiling parts, which are themselves hinged moveably, preferably flapably, to the vehicle. These ceiling parts, which can form, for example, the vehicle roof with the roof construction being folded together, can be hinged to side walls of the vehicle which can be hinged down.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

FIG. 2b shows a top view onto the roof construction shown in FIG. 2a.

Figure 1A:
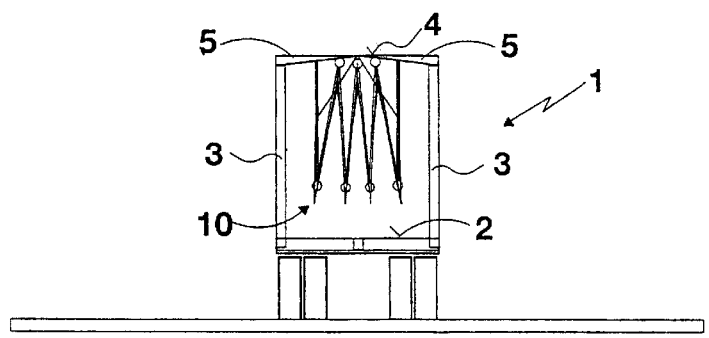
FIG. 1a–1d shows the sequence of motion of the inventive roof construction designed as surface mounting of a lorry when unfolding from a completely folded state (FIG. 1a) into its completely unfolded final state (FIG. 1d), each in a rear view of the lorry.

In FIG. 1a a lorry is denoted with 1, the body of which is closed in itself and comprises a loading area 2, side walls 3 and a lorry roof 4. In this construction, a roof construction 10 is hinged together or folded together like a bellow between the two side walls 3, which roof construction is held laterally on two roof halves 5 of the lorry roof 4 in a hanging fashion.

Figure 1B:
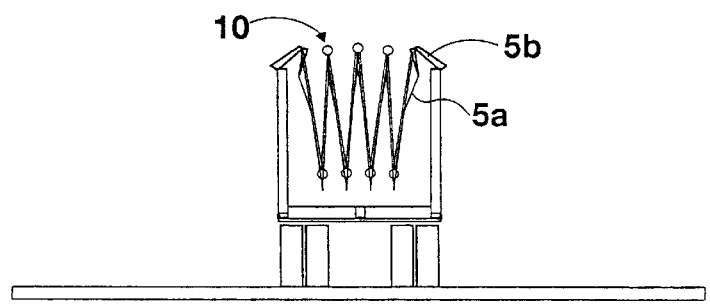

The sequence of motion for unfolding the roof construction 10 shown in FIG. 1a is described in the following by means of the FIGS. 1b to 1d. The unfolding procedure is started by opening the lorry roof 4. Each half of the roof 5 is formed by two roof parts 5a, 5b hinged to each other, where the inner roof part 5a folds downwards and simultaneously the outer roof part 5b which runs rotatable in bearings on the side wall 3 folds outwards. Thus, the distance between the two outer roof parts 5b is enlarged such that the roof construction held between the two roof parts 5a and 5b in a hanging fashion is lifted and slightly pulled apart, i.e. slightly unfolded (FIG. 1b). At the latest when the lorry roof 4 is fully opened, the upright side walls 3 are hinged outwards. Thus, the distance between the two outer roof parts 5b is enlarged and the roof construction 10 is further pulled apart or unfolded (FIG. 1c).

The roof construction 10 itself comprises several support arches 11 disposed behind one another in a longitudinal direction 24 (FIG. 2) of the lorry 1, which support arches 11 can each be folded together like a bellow. Each support arch 11 is formed by several sections 12, which are connected chain-like via joints 13. The two outer sections 12 of each support arch 11 are each hinged to the outer roof parts 5b.

Figure 1C:
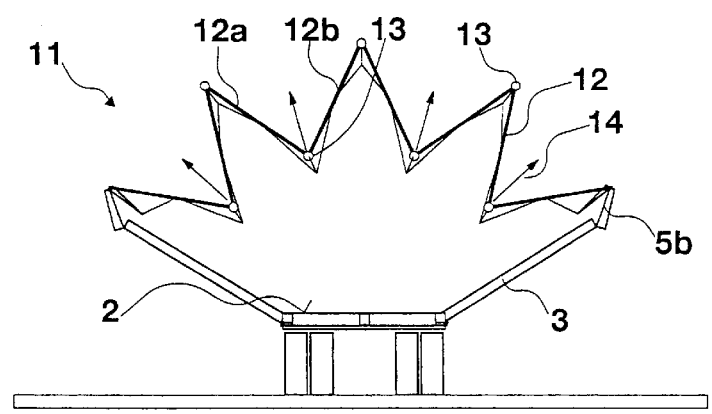

If the roof construction 10 or its support arches 11 are transferred into the position shown in FIG. 1c by hinging down the two side walls 3, the joints 13 being inside of the support arch 11 are, as indicated by the arrows 14, for example, pushed outwards by a person standing on the loading area 2 and hence neighboring sections 12 are unfolded. Each joint 13 is assigned a lock (not shown), which limits the unfolding of neighboring sections 12 to about their straightened position.

Figure 1D:
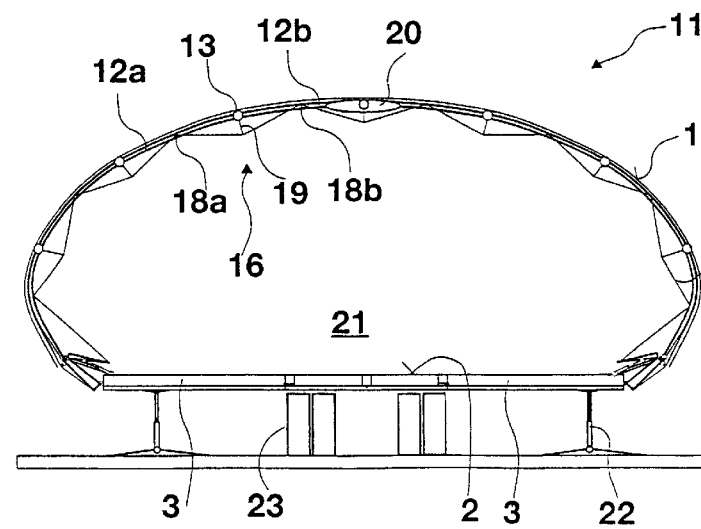

In this straightened position the individual sections 12 then supplement each other, as shown in FIG. 1d, to an erected support arch 11 which serves as support for a tentered roof skin 15. Furthermore, both side walls 3 are hinged down to the level of the loading area 2. In this erected state of the support arch 11 all of its joints 13 are each bridged underneath by tensioned pulling connections 16, which prevent the folding back of the sections 12 towards their folded position.

In the presented embodiment all the pulling connections 16 of a support arch 11 are formed by one single pulling rope 17 which tensions all sections 12 and joints 13 underneath. The pulling rope 17 engages on both sides of each joint 13 on the two bordering sections 12a, 12b respectively at 18a or 18b and is hinged in between towards the inside via the connecting line between the two points of engagement 18a, 18b. A spacer 19 provided on the joint 13 which directs the pulling rope 17 inwards serves to this purpose. The tensile force of the tensioned pulling rope 17 acting between both points of engagement 18a, 18b leads to a force component pointing outwards due to the excursion on the spacer 19 and thus also on the joint 13, which takes up or compensates the gravitational forces acting on the joint 13. The means for pulling, which can for example be of hydraulic kind, necessary for tensioning the pulling rope 17, are not shown in the drawing.

The roof skin 15 is preferably a foldable membrane, which is permanently connected to the support arches 11 and can be unfolded and folded with those support arches 11. In particular, it can be unfolded via the sections 12 of the support arches 11 after lateral hinging out of the side walls 3. In the crown area of the erected roof construction 10 the roof skin 15 comprises clear areas 20, through which daylight can enter into the roofed over inner space 21.

Via means not shown the side walls 3 are fixed in their position when hinged down to the level of the loading area 2, such that the loading area 2 and the side walls 3 form a flat platform. For a loading area 2 which is 14 m long and for a width of the loading area 2 and the side walls 3 of altogether 8, 30 m, the base area of the platform is already about 116 m². The side walls 3 hingeded down are held via base supports 22 on the level of the loading area 2.

If the loading area 2 is not supported by the wheels 23 of the lorry 1 but also via base supports, the lorry 1 can be removed beneath the unfolded roof construction 10 after detaching its loading area 2 and side walls 3 by driving forwards.

Figure 2A:
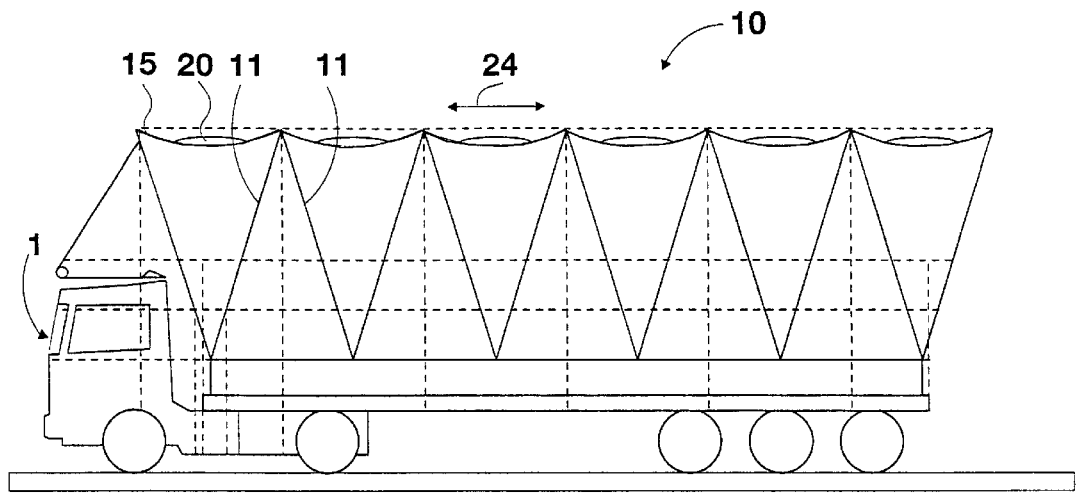
FIG. 2a shows a side view of the lorry with completely unfolded roof construction.
Figure 2B:
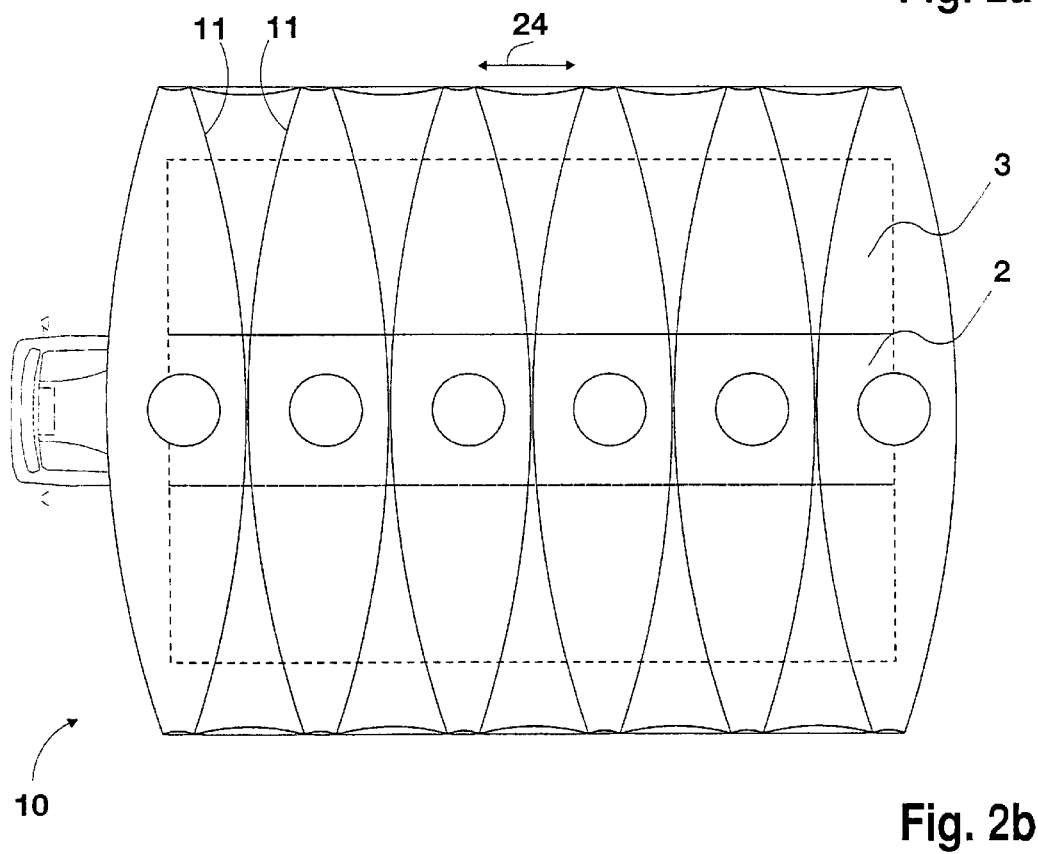

In the FIGS. 2a and 2b the side and top view, respectively, onto the unfolded roof construction 10 is shown. The roof construction 10 is formed by several support arches 11 disposed behind each other in longitudinal direction 24 of the roof construction 10, which, in order to stiffen the roof construction 10 in longitudinal direction 24 are slanted towards each other in pairs and touch in the crown area.

What is claimed is:

1. Self-supporting erectable roof comprising:
   a roof skin;
   a plurality of erectable support arches for carrying the roof skin, each support arch having ends held in a fixed spaced apart distance from one another with the roof skin extending between the ends of each support arch, each support arch comprising a plurality of sections connected to one another by lockable joints, each joint limiting unfolding of adjacent sections to an aligned relationship with one another;
   tensioned pulling connections, disposed beneath the arches and bridging each joint, the pulling connections engaging respective arches at points between adjacent joints;
   spacers, disposed between the pulling connections and the arches at each joint, for urging the pulling connections inwardly from a straight line between adjacent engagement points.

2. The erectable roof according to claim 1 wherein the support arches are disposed in a spaced apart relationship with one another along a longitudinal direction.

3. The erectable roof according to claim 2 wherein adjacent support arches abut one another in a crown area of the roof.

4. The erectable roof according to claim 1 further comprising side walls hingeably connected to the support arch ends for holding the support arch ends in the fixed spaced apart distance from one another.

5. The erectable roof according to claim 4 wherein said side walls form a base for the roof with the support arch ends in the fixed spaced apart distance from one another.

6. The erected roof according to claim 4 wherein said side walls are moveable to an upright position with the support arches disposed between said side walls.

7. The erectable roof according to claim 6 wherein outward hinge movement of said side walls enables upward unfolding of the support arches.

8. The erectable roof according to claim 1 wherein the pulling connectors comprises a single common pulling rope.

9. The erectable roof according to claim 1 wherein the support arches are formed from a fiber-enhanced glass material.

10. The erectable roof according to claim 1 wherein said roof skin is a light penetrable membrane.

11. The erectable roof according to claim 5 wherein the base further comprises a loading area of a lorry and the side walls are hingeably connected to sides of the loading area.

12. The erectable roof according to claim 11 further comprising base supports for supporting the side walls in a position level with the loading area.

13. A lorry comprising a loading area and a self-supporting erectable roof, the roof comprising:
    a roof skin;
    a plurality of erectable support arches for carrying the roof skin, each support arch having ends held in a fixed spaced apart distance from one another with the roof skin extending between the ends of each support arch, each support arch comprising a plurality of sections connected to one another by lockable joints, each joint limiting unfolding of adjacent sections to an aligned relationship with one another:
    tensioned pulling connections disposed between the arches and bridging each joint, the pulling connections engaging the respective arches at points between adjacent joints;
    spacers disposed between the pulling connections and the arches at each point for urging the pulling connections inwardly from a straight line between adjacent engagement points.

14. The erectable roof according to claim 13 further comprising side walls hingeably connected to the support arch ends and the loading area for holding the support arch ends in the fixed spaced apart distance from one another.

15. The erectable roof according to claim 14 wherein said side walls and loading area form a base for the roof with the support arch ends in the fixed spaced apart distance from one another.

16. The erectable roof according to claim 15 wherein said side walls are moveable to upright portion with the support arches between disposed therebetween.

17. The erectable roof according to claim 16 wherein the support arches are disposed in a spaced apart relationship with one another along a longitudinal direction.

18. The erectable roof according to claim 17 wherein adjacent support arches abut one another in a crown area of the roof.

19. The erectable roof according to claim 18 wherein outward hinge movement of said side walls enables upward unfolding of the support arches.

* * * * *